United States Patent [19]
Siefers, Jr.

[11] Patent Number: 5,429,150
[45] Date of Patent: Jul. 4, 1995

[54] CONTINUOUS FLOW STEAM CONDENSATE REMOVAL DEVICE

[76] Inventor: H. Kenneth Siefers, Jr., 9514 Woodcrest Rd., Pittsburgh, Pa. 15237

[21] Appl. No.: 198,196

[22] Filed: Feb. 17, 1994

[51] Int. Cl.⁶ ............................................. F16T 1/34
[52] U.S. Cl. .................................... 137/177; 55/466; 137/44
[58] Field of Search .......................... 137/177; 138/44; 55/466

[56] References Cited

U.S. PATENT DOCUMENTS

| | | | |
|---|---|---|---|
| 2,790,463 | 4/1957 | Delano et al. | 138/44 |
| 4,171,209 | 10/1979 | Brown | 55/466 |
| 4,426,213 | 1/1984 | Stavropoulos | 55/466 |
| 4,486,208 | 12/1984 | Stavropoulos | 55/466 |
| 4,745,943 | 5/1988 | Mortensen | 137/177 |
| 5,060,686 | 10/1991 | Troy | 138/44 X |
| 5,120,336 | 6/1992 | LeBlanc | 55/466 |
| 5,123,452 | 6/1992 | LeBlanc | 55/466 X |
| 5,137,556 | 8/1992 | Kouldgedrgas | 55/466 |

OTHER PUBLICATIONS

Richard E. Batherman, Steam Traps, pp. 45–50, 55–60, Nov. 1982, Heating/Piping/Air Conditioning.

William O'Keefe, Special Report—Steam Traps, pp. S.1–16, May 1984, Power.

*Primary Examiner*—Gerald A. Michalsky
*Attorney, Agent, or Firm*—Walter J. Blenko, Jr.; Kirk D. Houser

[57] ABSTRACT

The application discloses a continuous flow steam condensate removal device for use in a steam condensate removal system of a type which includes a steam condensate line, a Y-strainer for removing debris from the steam condensate line, and a condensate return line. The condensate removal device is an elongated unitary one-piece body having an entrance end, an entrance passageway, an intermediate passageway, an exit passageway, and an exit end. The intermediate passageway includes a cylindrical venturi tube, which is adjacent an exit of the entrance passageway, and a downstream cylindrical discharge-transition passageway which is adjacent an exit of the venturi tube. The downstream cylindrical discharge-transition passageway has a diameter larger than a diameter of the venturi tube and a length larger than a length of the venturi tube. A ratio of the length to the diameter of the downstream cylindrical discharge-transition passageway is greater than five in order to provide an efficient flow of condensate through the device. A ratio of the length of the downstream cylindrical discharge-transition passageway to the length of the venturi tube may be greater than five.

16 Claims, 2 Drawing Sheets

FIG.1
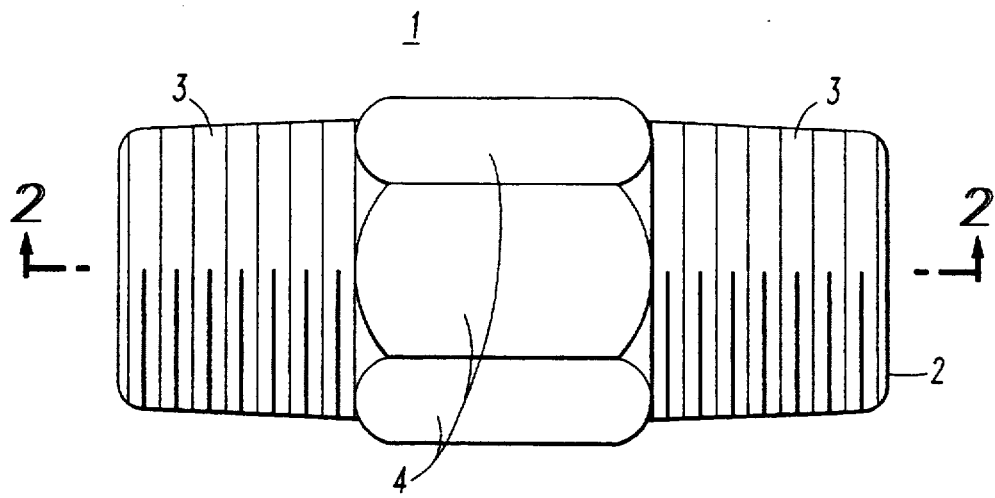
FLOW DIRECTION →
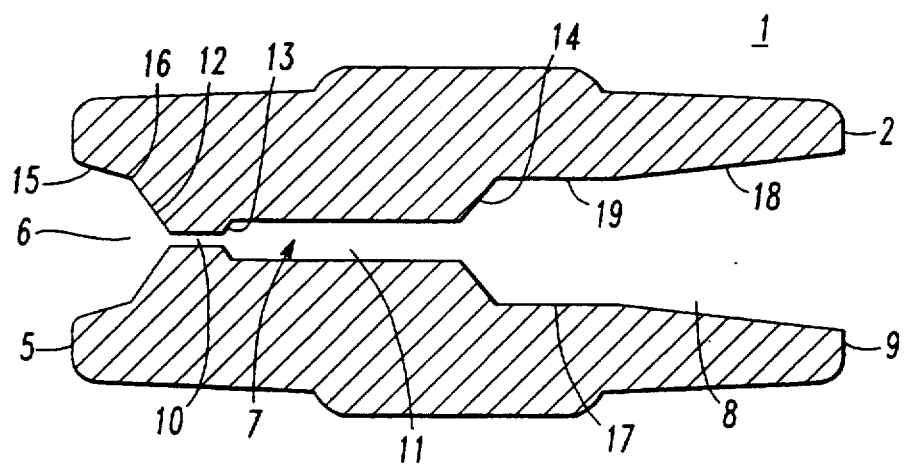
FIG.2

CONTINUOUS FLOW STEAM CONDENSATE REMOVAL DEVICE

This invention relates to a device for continuously removing condensate from a steam condensate line. More particularly, this invention relates to such a device which comprises a tapered passageway within a conduit.

A variety of proposals have been advanced for controlling a flow of condensate from a steam condensate line. An early proposal uses a partially open valve in order to discharge condensate from the steam condensate line. The partially open position of the valve is critical for proper operation. If the valve is open too far, then too much steam is lost through the valve, which results in inefficient operation and loss of steam energy. On the other hand, if the valve is closed too far, then a flow of steam through the steam condensate line is impeded and insufficient condensate is discharged.

A more recent proposal uses a condensate discharge device having external screw threads on both ends of a unitary body, a venturi-type orifice in the center of the body, and inlet and outlet passageways for continuously removing condensate from the steam condensate line.

Such a device is shown in Mortensen U.S. Pat. No. 4,745,943 issued May 24, 1988. The apparatus shown in the Mortensen patent comprises an elongated tubular unitary body having an entrance end, an intermediate portion and an exit end. A cylindrical venturi-type nozzle is formed in the intermediate portion of the unitary body and extends along a longitudinal axis thereof An elongated cylindrical upstream condensate collection passageway, which has a larger diameter than a diameter of the venturi-type nozzle, extends from adjacent the entrance end and along the longitudinal axis of the unitary body to adjacent the venturi-type nozzle.

A preferred practice of the apparatus shown in the Mortensen patent uses a relatively long condensate collection passageway before the venturi-type nozzle, in order to prevent an escape of steam therethrough. In particular, a length of the condensate collection passageway is preferably twice a length of a downstream condensation discharge passageway at the exit end. However, the energy conservation efficiency of the apparatus shown in the Mortensen patent and the ease of manufacturing such apparatus have not met desired standards.

In an energy system which includes both liquid and vapor phase components, widely divergent densities exist between the high density liquid phase component and the low density vapor phase component. Whenever both liquid phase and vapor phase components of a fluid, such as water, are concurrently forced under pressure through a small diameter tube, such as a venturi tube, the small diameter tube acts as a volumetric discharge device. Such a device favors a discharge of the higher density liquid phase component in terms of mass per unit time Furthermore, under equal pressure conditions, such as occur at a point of condensate removal from a steam condensate line, the higher density of the liquid phase component results in a lower linear velocity than a velocity of the vapor phase component. Accordingly, a choking effect exists where the slower liquid phase component retards a flow rate of the generally faster vapor phase component.

I provide an elongated unitary one-piece continuous flow steam condensate removal device having an entrance end, an entrance passageway, an intermediate passageway, an exit passageway, and an exit end. I provide such passageways which form a continuous conduit from the entrance end to the exit end of the device and extend therethrough. I further provide an intermediate passageway which includes a cylindrical venturi tube adjacent an exit of the entrance passageway and a downstream cylindrical discharge-transition passageway adjacent an exit of the venturi tube. I further provide an entrance passageway which flares substantially inward in a downstream direction and an exit passageway which flares substantially outward in a downstream direction.

I prefer to provide a downstream cylindrical discharge-transition passageway which has a diameter larger than a diameter of the venturi tube and a length larger than a length of the venturi tube. I further prefer to provide a ratio of the length to the diameter of the downstream cylindrical discharge-transition passageway which is greater than five. I also prefer to provide a ratio of the length of the downstream cylindrical discharge-transition passageway to the length of the venturi tube which is greater than five I additionally prefer to provide a ratio of a length of the intermediate passageway to a total length of the condensate removal device of at least 5/13.

I may provide an entrance passageway which has a substantially conical shape. Alternatively, I may provide an entrance passageway at the entrance end which flares inward at a first angle with respect to a longitudinal axis of the device and also flares inward at a second angle with respect to the longitudinal axis toward an entrance of the venturi tube. Alternatively, I provide an entrance passageway which includes at least two upstream cylindrical collection passageways, each of the collection passageways having a larger diameter than the diameter of the venturi tube, one of the collection passageways located adjacent the entrance end, another one of the collection passageways located adjacent an entrance of the venturi tube. Alternatively, I may further provide plural internal conically tapered surfaces interconnecting the entrance end with the collection passageway adjacent the entrance end interconnecting adjacent ones of the collection passageways, and interconnecting the collection passageway adjacent the entrance end of the venturi tube with the entrance of the venturi tube.

I may also provide an exit passageway which has a substantially conical shape. Alternatively, I provide an exit passageway which includes a substantially cylindrical shape adjacent an exit of the downstream cylindrical discharge-transition passageway and a substantially conical shape adjacent the exit end.

I prefer to provide a device which has no more than three bores and no more than five tapered passageways on a longitudinal axis of the device.

Other details, objects, and advantages of my invention will become more apparent as the following description of a present preferred embodiment thereof proceeds.

In the accompanying drawings, I have illustrated a present preferred embodiment of my invention in which:

FIG. 1 is a side view of a continuous flow steam condensate removal device in accordance with the invention;

FIG. 2 is a cross-sectional view taken along line 2—2 of the device of FIG. 1.

Figure 3:
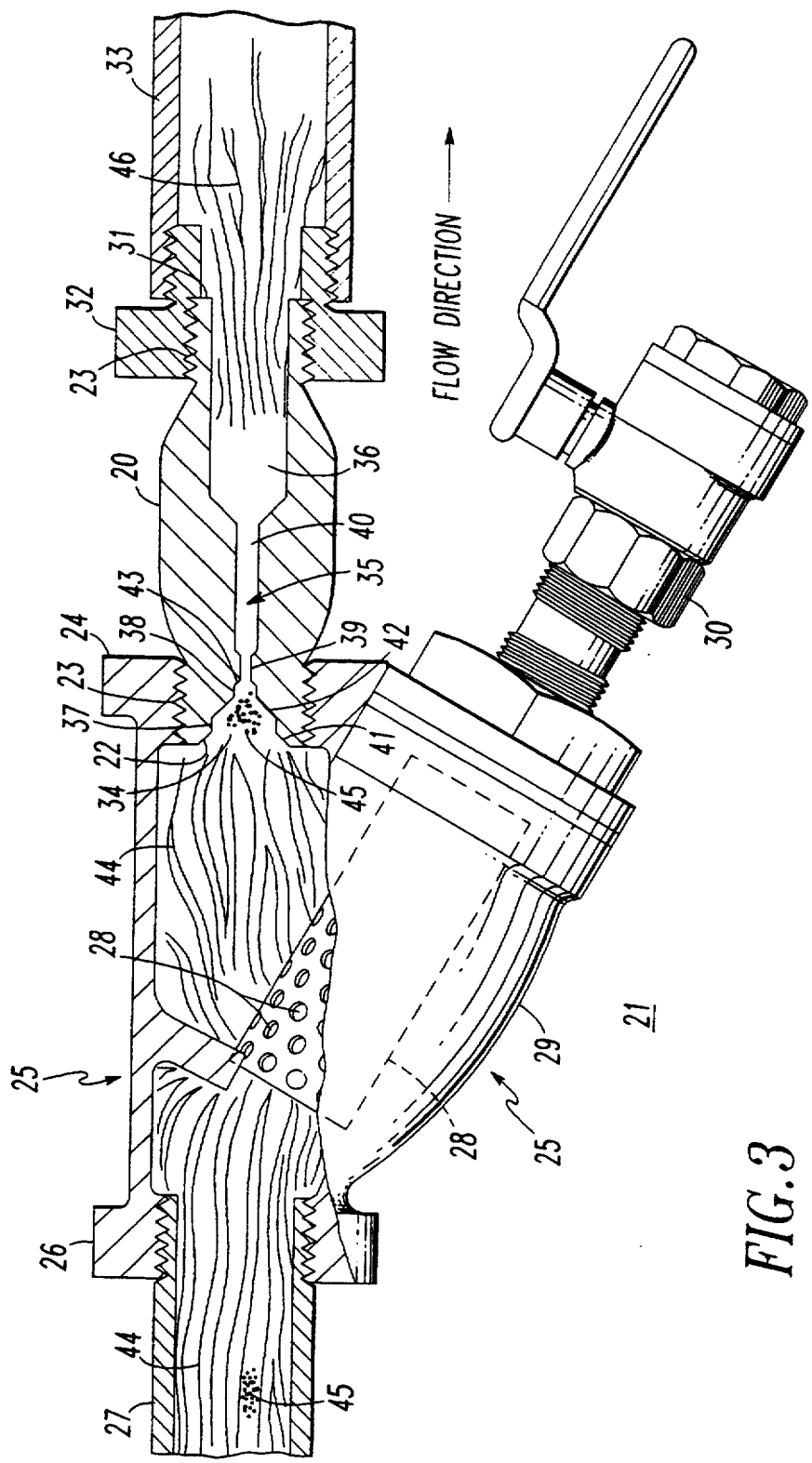
FIG. 3 is a partial cross-sectional view, showing an alternative embodiment of a continuous flow steam condensate removal device in accordance with the invention, which is mounted in a steam condensate removal system.

A continuous flow steam condensate removal device 1 is illustrated in a side view, in FIG. 1. The device 1 includes an elongated unitary one-piece body 2 having external screw threads 3 formed at opposite ends thereof. The unitary body 2 also has a hexagonal form, with opposite flat surfaces 4 formed at its center intermediate the external screw threads 3, to facilitate connecting the device 1 with other screw threaded parts 25,32 of a steam condensate removal system 21, as shown in FIG. 3. The exemplary unitary body 2 is machined from 300-series stainless steel.

The continuous flow steam condensate removal device 1 is illustrated in a cross-sectional view, in FIG. 2. The unitary body 2 has an entrance end 5, an entrance passageway 6, an intermediate passageway 7, an exit passageway 8, and an exit end 9. A flow of condensate, as shown in FIG. 2, is from the entrance end 5 to the exit end 9. The passageways 6,7,8 form a continuous conduit from the entrance end 5 to the exit end 9 and extend therethrough. The intermediate passageway 7 includes a cylindrical venturi tube 10 adjacent an exit of the entrance passageway 6 and a downstream cylindrical discharge-transition passageway 11 adjacent an exit of the venturi tube 10.

The entrance passageway 6 has a substantially conical shape and flares inward in a downstream direction from the entrance end 5 to an entrance of the venturi tube 10. The exit passageway 8 has a substantially conical shape and flares substantially outward in a downstream direction from adjacent an exit of the downstream cylindrical discharge-transition passageway 11 to the exit end 9.

Three internal conically tapered surfaces 12,13,14, respectively, interconnect the exit of the entrance passageway 6 and an entrance of the venturi tube 10, the exit of the venturi tube 10 and an entrance of the downstream cylindrical discharge-transition passageway 11, and the exit of the downstream cylindrical discharge-transition passageway 11 and an entrance of the exit passageway 8.

At the entrance end 5, a surface 15 of the entrance passageway 6 flares angularly inward with respect to the longitudinal axis of the unitary body 2. Within the entrance passageway 6, after a point 16, which is generally midway between the entrance end 5 and the entrance of the venturi tube 10, the internal conically tapered surface 12 flares angularly inward at a greater angle, with respect to the longitudinal axis of the unitary body 2, than an angle of surface 15.

The exit passageway 8 includes a cylindrical exit passageway 17 and a conical exit passageway 18. The cylindrical exit passageway 17 interconnects an exit of the internal conically tapered surface 14 with an entrance of the conical exit passageway 18 at a point 19. The conical exit passageway 18 flares angularly outward, with respect to the longitudinal axis of the unitary body 2, from the point 19 to the exit end 9.

An alternative embodiment of a continuous flow steam condensate removal device 20, which is mounted in the steam condensate removal system 21, is illustrated in a partial cross-sectional view, in FIG. 3. An entrance end 22 of the condensate removal device 20 has external screw threads 23 and is screw-threadably connected into an end 24 of a conventional Y-strainer 25. An opposite end 26 of the Y-strainer 25 is screw-threadably connected to a conventional steam condensate line 27 at a point in the steam condensate removal system 21 where condensate normally collects. A cylindrical screen 28 is disposed in a branch leg 29 of the Y-strainer 25, in order that any debris in the steam condensate line 27 is removed before reaching the condensate removal device 20. The branch leg 29 of the exemplary Y-strainer 25 has a conventional blow-down valve 30 for periodically removing the debris collected by the screen 28. It being understood by those skilled in the art that the blow-down valve 30 of the Y-strainer 25 must be used with caution and is not required in some applications. The exit end 31 of the condensate removal device 20 also has external screw threads 23 and is screw-threadably connected by a coupling member 32 to a condensate return line 33.

The alternative condensate removal device 20 has the entrance end 22, an entrance passageway 34, an intermediate passageway 35, an exit passageway 36, and the exit end 31. A flow of condensate, as shown in FIG. 3, is from the entrance end 22 to the exit end 31. The passageways 34,35,36 form a continuous conduit from the entrance end 22 to the exit end 31 of the device 20 and extend therethrough. The intermediate passageway 35 includes a cylindrical venturi tube 39 adjacent an exit of the entrance passageway 34 and a downstream cylindrical discharge-transition passageway 40 adjacent an exit of the venturi tube 39.

The entrance passageway 34 includes two upstream cylindrical collection passageways 37,38. Each of the collection passageways 37,38 has a larger diameter than a diameter of the venturi tube 39. One of the collection passageways 37 is located adjacent the entrance end 22. A diameter of the collection passageway 37 is greater than a diameter of the collection passageway 38. The other collection passageway 38 is located adjacent an entrance of the venturi tube 39. The exit passageway 36 has a conical shape and flares outward in a downstream direction.

The condensate removal device 20 further has three internal conically tapered surfaces 41,42,43 which, respectively, interconnect the entrance end 22 with the collection passageway 37, the collection passageway 37 with the collection passageway 38, and the collection passageway 38 with the entrance of the venturi tube 39. The entrance passageway 34 flares substantially inward in a downstream direction from the entrance end 22 to an entrance of the venturi tube 39.

The steam condensate removal devices 1, of FIGS. 1-2, and 20, of FIG. 3, may have similar, or different, condensate removal capacities and dimensions. In particular, a diameter of the venturi tubes 10,39 is increased, in order to provide a greater condensate removal capacity. Table I, below, illustrates a range of various diameters and lengths for three embodiments, including, A, of FIGS. 1-2, and B and C, of FIG. 3.

TABLE I

| PART | A (inches) | B (inches) | C (inches) |
| --- | --- | --- | --- |
| Entrance passageway 6,34 length | 0.420 | 0.500 | 0.308 |
| Entrance passageway 6,34 maximum diameter | 0.750 | 0.500 | 0.374 |
| Venturi tube 10,39 length | 0.200 | 0.120 | 0.067 |
| Venturi tube 10,39 minimum diameter | 0.030 | 0.030 | 0.026 |
| Venturi tube 10,39 maximum diameter | 0.197 | 0.156 | 0.060 |

TABLE I-continued

| PART | A (inches) | B (inches) | C (inches) |
|---|---|---|---|
| Discharge passageway 11,40 length | 1.130 | 1.130 | 1.625 |
| Discharge passageway 11,40 diameter | 0.200 | 0.200 | 0.200 |
| Intermediate passageway 7,35 length | 1.330 | 1.250 | 1.692 |
| Exit passageway 8,36 length | 1.500 | 1.500 | 0.750 |
| Exit passageway 8,36 maximum diameter | 0.785 | 0.785 | 0.600 |
| Total length of device 1,20 | 3.250 | 3.250 | 2.750 |

As summarized by Table I, above, a ratio of a length to a diameter of the downstream cylindrical discharge-transition passageway 11,40 is greater than five. Also, a ratio of the length of the downstream cylindrical discharge-transition passageway 11,40 to the length of the venturi tube 10,39 is greater than five and a ratio of the length of the downstream cylindrical discharge-transition passageway 11,40 to the length of the entrance passageway 6,34 is greater than two. Furthermore, the entrance passageway 6,34 has a smaller length than a length of the intermediate passageway 7,35 and a length of the exit passageway 8,36.

As further summarized by Table I, a ratio of a total length of the device 1,20 to the length of the entrance passageway 6,34 is greater than six, a ratio of the total length of the device 1,20 to the length of the venturi tube 10,39 is greater than sixteen, and a ratio of the length of the intermediate passageway 7,35 to the total length of the device 1,20 is at least 5/13. Also, a ratio of the length of the exit passageway 8,36 to the length of the entrance passageway 6,34 is greater than two and a ratio of the length of the exit passageway 8,36 to the length of the venturi tube 10,39 is greater than seven.

As illustrated in FIG. 3, a relatively low density steam 44 and a relatively high density condensate 45 pass through the steam condensate line 27 and approach, under equal pressure, the venturi tube 39 near the entrance end 22 of the continuous flow steam condensate removal device 20. Because of the relatively higher density of the liquid phase condensate 45 with respect to the vapor phase steam 44 the condensate 45 travels at a lower linear velocity than a velocity of the steam 44.

Referring to FIGS. 2 and 3, it has been found that an improvement of the steam energy conservation and condensate removal efficiencies have been achieved under two conditions, as described above, for the exemplary embodiments. First, the ratio of the length to the diameter of the downstream cylindrical discharge-transition passageway 11,40 is greater than five. Second, the length of the venturi tube 10,39 is no greater than 0.200 inches and, preferably, is no greater than 0.125 inches. Under these conditions, in accordance with the invention, the slower liquid phase condensate component 45 effectively provides an optimal choking effect and efficiently retards the flow rate of the vapor phase steam component 44.

As is well known in the art, as a liquid, such as the condensate 45, passes through a constriction having a relatively narrow diameter, such as the venturi tube 10,39, a dynamic pressure of the liquid is reduced by the constriction. As the liquid emerges from the constriction and enters a tube having a diameter larger than the constriction, such as the downstream cylindrical discharge-transition passageway 11,40, a small amount of flash vapor emanates from the liquid at the entrance of the discharge-transition passageway 11,40. The increased diameter of the downstream cylindrical discharge-transition passageway 11,40, with respect to the diameter of the venturi tube 10,39, accommodates the flash vapor. Then, as the condensate 45 and the flash vapor pass through the length of the device 1,20 and enter the condensate return line 33, the flash vapor cools and condenses into condensate.

The optimal choking effect on the steam 44 and, hence, the optimal removal efficiency for the condensate 45 is achieved by the exemplary devices 1,20. The venturi tube 10,39 acts as a volumetric discharge device and favors a discharge of the relatively higher density condensate 45 in terms of mass per unit time. The higher density of the condensate 45 results in a lower linear velocity than a velocity of the steam 44. The length of the intermediate passageway 7,35, across which the faster moving steam 44 must pass the slower moving condensate 45 in order to exit the device 1,20, determines a choking effect on the steam 44 and a removal efficiency for the condensate 45. The length of the exemplary intermediate passageway 7,35 in general, and the length of the exemplary downstream cylindrical discharge-transition passageway 11,40 in particular, permit the condensate 45 and the flash vapor to effectively choke the flow of the steam 44 and, therefore, efficiently remove the condensate 45.

Finally, as the condensate 45 and the small amount of flash vapor enter the exit passageway 8,36, which generally has an increasingly larger diameter opening, the condensate 45 is placed in a dispersed flow pattern 46 within the coupling member 32 and the condensate return line 33. The flow pattern 46 consists of liquid droplets having a velocity greater than 200 feet per second.

With regard to manufacturing costs, the device 1 of FIGS. 1-2 is preferred. The device 1 requires three bores 10,11,17 and five tapered passageways 12,13,14,15,18 within a longitudinal axis of the device.

While I have illustrated and described a present preferred embodiment of my invention, it is to be understood that I do not limit myself thereto and that my invention may be otherwise variously practiced within the scope of the following claims.

I claim:

1. A continuous flow steam condensate removal device in a system through which a medium flows with both a liquid phase component and a first vapor phase component, said device comprising an elongated unitary one-piece body having an entrance end, an entrance passageway, an intermediate passageway, an exit passageway, and an exit end;

the passageways forming a continuous conduit from the entrance end of said unitary one-piece body to the exit end of said unitary one-piece body and extending therethrough;

the entrance passageway adjacent the entrance end of said unitary one-piece body, flaring substantially inward in a downstream direction from the entrance end of said unitary one-piece body to an entrance of said venturi tube;

the intermediate passageway including:
  a cylindrical venturi tube adjacent an exit of the entrance passageway of said unitary one-piece body, said venturi tube discharging a portion of said liquid phase component and a second vapor phase component which emanates from said liquid phase component, and a downstream cylindrical discharge-transition passageway adjacent an exit of said venturi tube, having a diameter larger than a diameter of said venturi tube and a length larger than a length of said venturi tube, a ratio of the length to the diameter of said downstream cylindrical discharge-transition passageway is greater than five, the diameter of said cylindrical discharge-transition passageway accommodating said second vapor phase component, the portion of said liquid phase component and said second vapor phase component passing through the length of said downstream cylindrical discharge-transition passageway and effectively retarding a flow rate of said first vapor phase component in order to efficiently remove the portion of said liquid phase component and said second vapor phase component from said downstream cylindrical discharge-transition passageway to the exit passageway; and the exit passageway flaring substantially outward in a downstream direction from adjacent an exit of said downstream cylindrical discharge-transition passageway to the exit end of said unitary one-piece body.

2. The condensate removal device as recited in claim 1 wherein the entrance passageway of said unitary one-piece body has a substantially conical shape and a length smaller than a length of the exit passageway.

3. The condensate removal device as recited in claim 1 wherein said unitary one-piece body further has an internal conically tapered surface interconnecting the exit of the entrance passageway and an entrance of said venturi tube, the entrance passageway of said unitary one-piece body has a substantially conical shape and flares inward at a first angle with respect to a longitudinal axis of said unitary one-piece body, and the internal conically tapered surface flares inward at a second angle with respect to the longitudinal axis of said unitary one-piece body.

4. The condensate removal device as recited in claim 3 wherein the first angle of the entrance passageway is less than the second angle of the internal conically tapered surface.

5. The condensate removal device as recited in claim 1 wherein said unitary one-piece body further has plural internal conically tapered surfaces interconnecting the entrance passageway of said unitary one-piece body and an entrance of said venturi tube, the exit of said venturi tube and an entrance of said downstream cylindrical discharge-transition passageway, and the exit of said downstream cylindrical discharge-transition passageway and an entrance of the exit passageway.

6. The condensate removal device as recited in claim 1 wherein the exit passageway of said unitary one-piece body has a substantially conical shape, a larger diameter than the diameter of said downstream cylindrical discharge-transition passageway, and a larger length than the length of said venturi tube.

7. The condensate removal device as recited in claim 1 wherein a ratio of the length of said downstream cylindrical discharge-transition passageway to the length of said venturi tube is greater than five.

8. The condensate removal device as recited in claim 1 wherein a ratio of a total length of said unitary one-piece body to a length of the entrance passageway of said unitary one-piece body is greater than six.

9. The condensate removal device as recited in claim 1 wherein a ratio of a total length of said unitary one-piece body to the length of said venturi tube is greater than sixteen.

10. The condensate removal device as recited in claim 1 wherein a ratio of the length of said downstream cylindrical discharge-transition passageway to a length of the entrance passageway of said unitary one-piece body is greater than two.

11. The condensate removal device as recited in claim 1 wherein a ratio of a length of the exit passageway of said unitary one-piece body to a length of the entrance passageway of said unitary one-piece body is greater than two.

12. The condensate removal device as recited in claim 1 wherein a ratio of a length of the exit passageway of said unitary one-piece body to the length of said venturi tube is greater than seven.

13. The condensate removal device as recited in claim 1 wherein the length of said venturi tube is no greater than 0.2 inch and the length of said downstream cylindrical discharge-transition passageway is greater than 1.0 inch.

14. The condensate removal device as recited in claim 1 wherein a ratio of a length of the intermediate passageway to a total length of the condensate removal device is at least 5/13.

15. The condensate removal device as recited in claim 1 wherein the entrance passageway of said unitary one-piece body includes at least two upstream cylindrical collection passageways, each of said collection passageways having a larger diameter than the diameter of said venturi tube, one of said collection passageways located adjacent the entrance end of said unitary one-piece body, another one of said collection passageways located adjacent an entrance of said venturi tube, said collection passageways having a largest diameter adjacent the entrance end of said unitary one-piece body, a smallest diameter adjacent the entrance of said venturi tube, and progressively smaller downstream diameters therebetween; and wherein said unitary one-piece body further has plural internal conically tapered surfaces interconnecting the entrance end of said unitary one-piece body with the collection passageway adjacent the entrance end of said unitary one-piece body, interconnecting adjacent ones of said collection passageways, and interconnecting the collection passageway adjacent the entrance end of said venturi tube with the entrance of said venturi tube.

16. The condensate removal device as recited in claim 1 wherein the exit passageway of said unitary one-piece body includes a cylindrical exit passageway adjacent an exit of said downstream discharge-transition passageway and a conical exit passageway adjacent an exit of the cylindrical exit passageway.

* * * * *